Dec. 10, 1963 W. L. MORGAN II 3,114,137

DUAL STRING MAGNETIC SHIFT REGISTER

Filed Sept. 29, 1959 2 Sheets-Sheet 1

INVENTOR
Walter L. Morgan II

BY
Q. Baxter Warner
Claude Funkhouser
ATTORNEYS

Dec. 10, 1963 W. L. MORGAN II 3,114,137

DUAL STRING MAGNETIC SHIFT REGISTER

Filed Sept. 29, 1959 2 Sheets-Sheet 2

United States Patent Office 3,114,137 Patented Dec. 10, 1963

3,114,137
DUAL STRING MAGNETIC SHIFT REGISTER
Walter L. Morgan II, Princeton, N.J., assignor, by mesne assignments, to the United States of America as represented by the Secretary of the Navy
Filed Sept. 29, 1959, Ser. No. 843,325
5 Claims. (Cl. 340—174)

Figure 1:
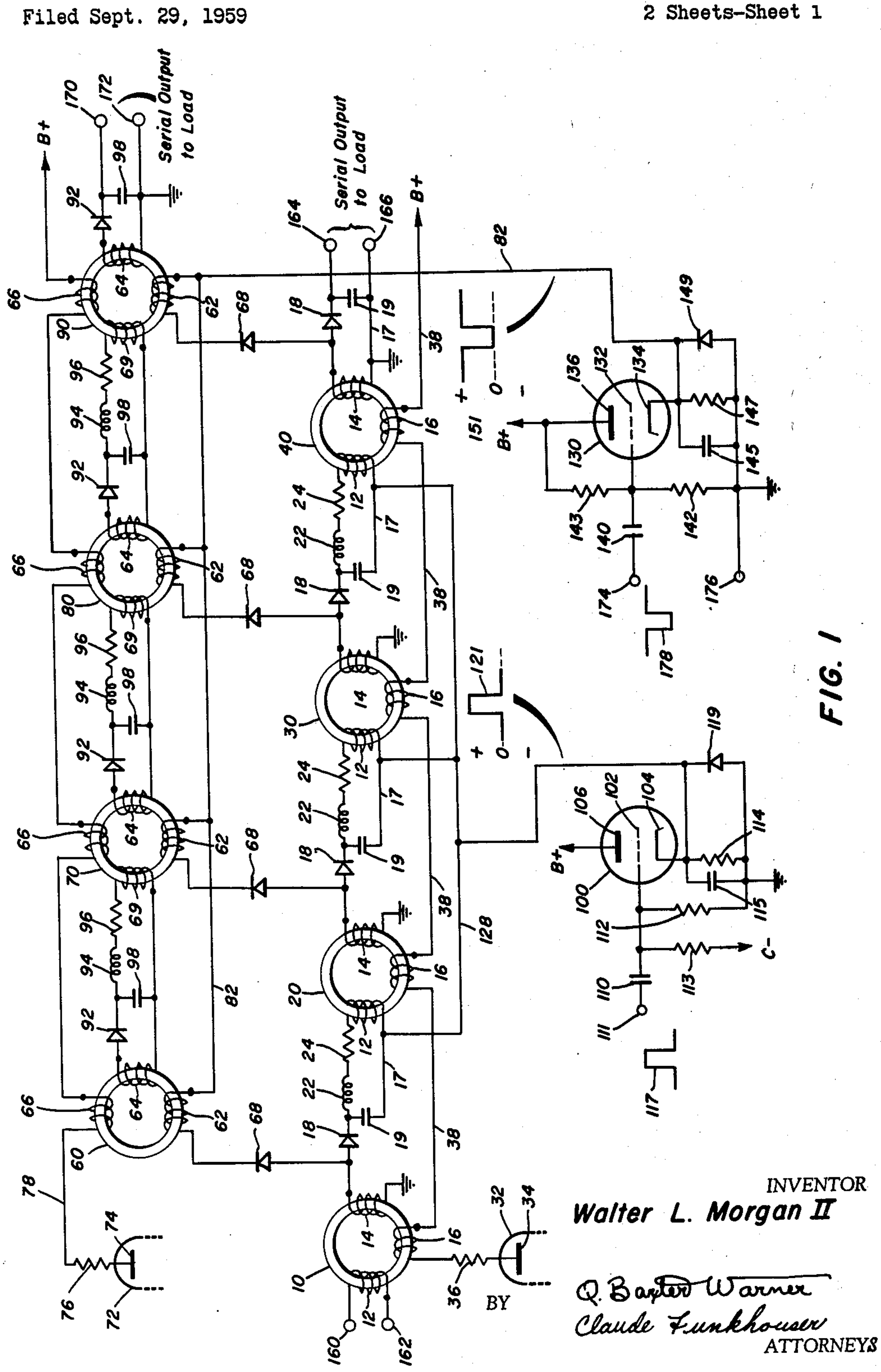

This invention relates to magnetic shift registers and more particularly to an improved circuit for transferring information from one magnetic shift register to another.

Digital storage devices of the shift register variety are utilized in computing circuitry to store serial pulse information in a cascaded array of magnetic cores, each successive core storing a successive bit of information. As information is received at the input end of the shift register, information theretofore stored in the shift register cores is stepped along the shift register in a serial manner toward the output end thereof.

Each of the cores of a shift register normally employs an input winding, an output winding and a shift winding, wound upon each individual core. The output winding of a particular core drives the input winding of the following core through an artificial transmission line including a serial impedance and a shunt capacitance functioning as an intermediate storage element. A unilateral impedance or diode is interposed between the output winding and the aforementioned shunt capacitance to prevent pulses of an undesired polarity from reaching and charging the capacitance; for example, a diode poled to pass positive currents from an output winding will allow the capacitor to charge only upon production of a positive pulse by the output winding. The shunt capacitance then subsequently discharges through the serial impedance of the transmission line and the input winding on the next shift register core, but is prevented from discharging back into the output winding of the preceding core by the high reverse impedance of the aforementioned diode. Bits of information are successively stepped along the shift register by means of a shift pulse generator, connected to energize the shift windings on all the cores. At the occurrence of a shift pulse positive pulses are caused to appear at the output of cores containing a pulse of information previously inserted at the input thereof.

The present invention contemplates the transfer of information from a first shift register to a second shift register in parallel fashion in substantially the time period of one shift pulse. In this manner, the first shift register may be cleared of the "word" it contains and may then receive further information at its input end. According to one feature of the invention a plurality of second shift registers are provided so that a "word" contained in the first shift register may be divided up into various letters and groups of letters contained in the first shift register. Thus an instantaneous decoding operation is carried out.

In accordance with the invention, a source of blocking pulses has its output connected respectively in series with the transmission line between the cores of the aforementioned first shift register. This source of pulses provides an output of such a polarity that it prevents conduction between the cores of the first shift register due to the rectifying action of the unilateral impedance or diode connected therebetween. Second diodes are connected from the output windings on the first shift register to input windings of one or more second shift registers in a parallel fashion. A second source of pulses is coupled to raise and lower the voltage levels of desired input windings on the second shift register so that the aforementioned second diodes are selectively allowed to transfer information from the first shift register or are prevented from doing so. As many second pulse sources may be employed as there are second shift registers.

It is a principal object of this invention to provide an improved circuit for transferring information from a first shift register into one or more second shift registers.

It is another object of this invention to provide an improved arrangement for substantially instantaneously transferring information from one shift register to another shift register with or without destroying the information in the first shift register, said information being retained in one or more shift registers for subsequent readout.

Figure 2:
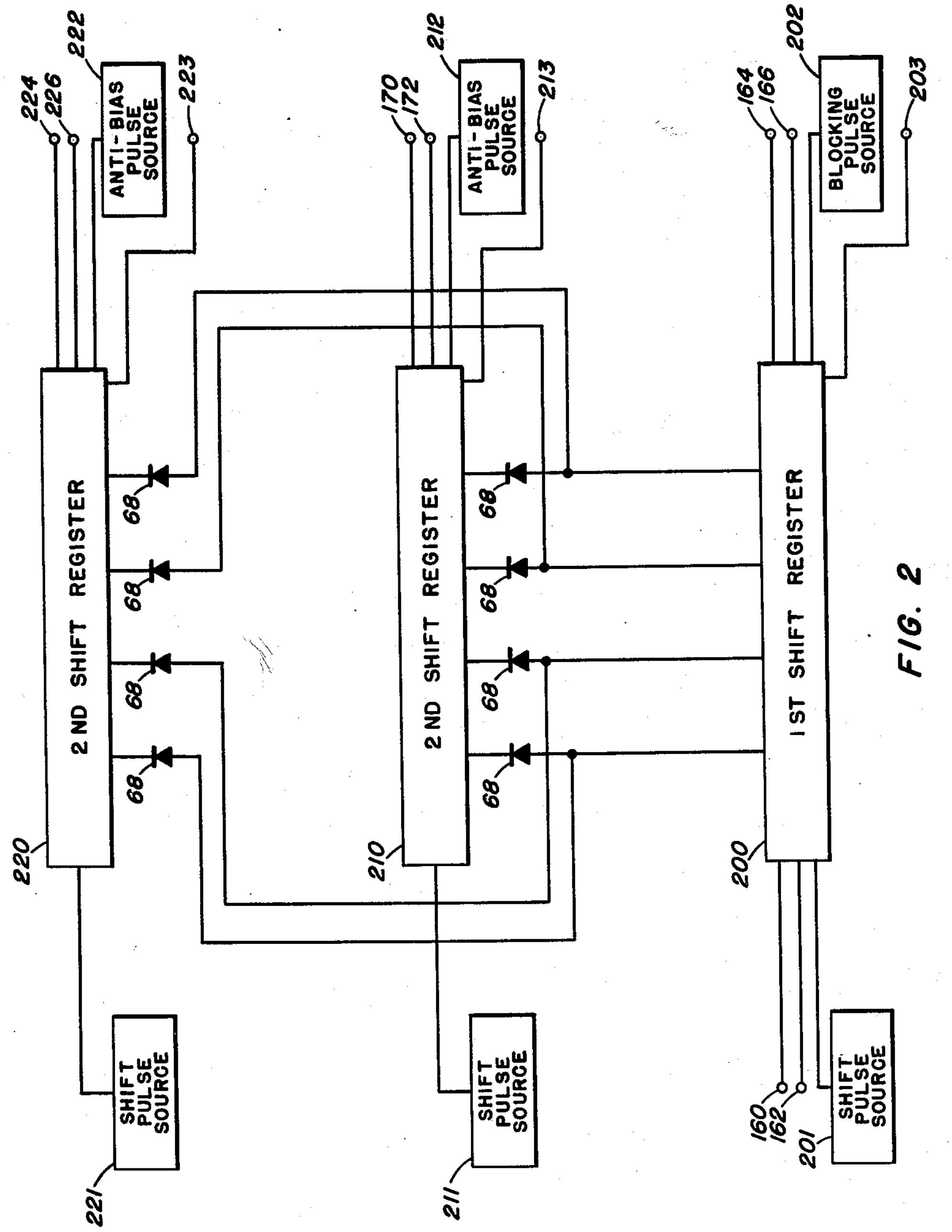

Other objects and many of the attendant advantages of this invention will be readily appreciated as the same becomes better understood by reference to the following detailed description when considered in connection with the accompanying drawings wherein:

FIG. 1 is a schematic diagram of one embodiment of the invention having a first and a second shift register, and FIG. 2 is a block diagram of the embodiment of FIG. 1 illustrating a plurality of second shift registers.

Referring now to the drawings, wherein like reference characters designate corresponding parts throughout several views, there is shown in FIG. 1, a first magnetic shift register composed of toroidal magnetic cores 10, 20, 30 and 40 connected in cascade. A second similar shift register is composed of cores 60, 70, 80 and 90. Each of these cores is constructed of a magnetic material having substantially a rectangular hysteresis loop, that is having two remnant conditions of substantial flux saturation, such materials being well known in the art. Each of the cores has wound thereon an input winding, an output winding and a shift winding. In the case of the first shift register, the input windings are designated at 12, the output windings at 14 and the shift windings at 16. The output windings of the second shift register cores are designated at 64, the shift windings at 66, a first input winding at 62 and a second input winding at 69.

Each of the windings shown on the drawing has a dotted end and a nondotted end, according to the convention of polarity presently employed for transformers and magnetic core devices. A positive pulse input to the dotted end of a winding will produce positive flux saturation in the core and a positive pulse output at the dotted ends of the other windings on the core, providing the core is not already in a positive state of flux saturation. If the core is already in a positive state of flux saturation no output will be produced. Likewise a negative input pulse at the dotted end of any one of the windings will produce a negative output pulse at the dotted end of any one of the other windings provided the intermediate core is not already in a negative state of flux saturation. If the core is already in the negative state of flux saturation no output will be produced. Introducing a positive pulse at the nondotted end of a winding is equivalent to introducing a negative pulse at the dotted end and vice versa.

Therefore, considering core 10 and the windings thereon, a positive pulse introduced at terminal 160 with respect to terminal 162, i.e. introduced at the nondotted end of winding 12, will cause core 10 to saturate in a negative direction. There will be produced thereby a negative output from winding 14 but diode 18 connected between the dotted end of winding 14 and the remaining circuitry will prevent the transfer of information to capacitor 19 or core 20. However, when the next periodic shift pulse is received at winding 16 of core 10 from plate 34 of shift pulse tube 32 through resistor 36, such pulse being of a negative polarity at the nondotted end of the winding, a positive pulse will result at the dotted end of output winding 14 and will therefore transfer through diode 18 to charge capacitor 19. The return circuit for capacitor 19 is through lead 128 and the parallel combination of capacitor 115 and resistor 114 to ground, the latter parallel combination having a relatively long time constant as compared with the short pulse charging time of capacitor 19.

Capacitor 19 will subsequently discharge through inductance 22 and resistor 24 causing a negative flux saturation of core 20, since this discharge current flows through winding 12 from its nondotted end to its dotted end. It is seen that the pulse introduced into core 10 by means of winding 12 has subsequently been shifted into core 20 by the occurrence of a shift pulse from tube 32. The negative shift pulse occurs periodically in a regular timed manner.

If no new information is introduced into core 10 at next serial time for input information, i.e. at a time between shift pulses, core 10 will remain in a state of positive flux saturation and the next succeeding shift pulse introduced at winding 16 will produce no output at winding 14. The usual successive operation of cores 20, 30, 40 and 50 is identical to that described in connection with core 10. New serial information pulses may be introduced into the input terminals 160 and 162 of the shift register during the interim period between shift pulses, the said information being thereafter shifted along the cascaded register by shift pulses from tube 32.

Cores 60, 70, 80 and 90 comprising the second shift register operate in a similar manner. For example, considering core 60 and the windings thereon, a positive pulse introduced at the nondotted end of winding 62, will cause core 60 to saturate in a negative direction. There will be produced thereby a negative output from winding 64 but diode 92 connected between the dotted end of winding 64 and the remaining circuitry will prevent the transfer of information to capacitor 98 or core 70. However, when the next periodic shift pulse is received at winding 66 of core 60 from plate 74 of shift pulse tube 72 through resistor 76, such pulse being of a negative polarity at the nondotted end of the winding, a positive output pulse will result at the dotted end of output winding 64 and will therefore transfer through diode 92 to charge capacitor 98. Capacitor 98 will subsequently discharge through inductance 94 and resistor 96 causing a negative flux saturation of core 70, since this discharge current flows through the second input winding 69 of core 70 and from its nondotted end to its dotted end. It is seen that the pulse introduced into core 60 by means of winding 62 has subsequently been shifted into core 70 by the occurrence of a shift pulse from tube 72. The negative shift pulses occur periodically, and the information inserted in core 60 will subsequently be propagated down the second shift register toward output terminals 170 and 172.

Operation of cores 70, 80 and 90 is identical to core 60 except that two input windings are provided, i.e., windings 62 and 69. Winding 69 is employed to receive information from the prior shift register core while winding 62 is employed to receive information in a parallel manner from the first shift register as will become more clearly apparent hereinafter. At any given pulse time, information may be received into a given core by either winding 62 or 69. However, only one of these windings is used at a time. Windings 62 are employed only to transfer the initial information into the second shift register comprising cores 60, 70, 80 and 90, but after such information has been initially inserted in each of the cores, coils 62 are no longer operated until the information has been shifted out of the register through output terminals 170 and 172.

The input windings 62 on the second shift register are connected respectively through diodes 68 to the high potential end of output windings 14 of corresponding first shift register cores. The opposite ends of each of the input windings 62 on the second shift register are connected through common lead 82 to cathode 134 of second pulse generator tube 130.

Tube 130 also has a plate 136 connected to B+, and a grid 132 coupled to input terminal 174 through input capacitor 140. A voltage divider comprising resistors 143 and 142 between B+ and ground has its center point attached to grid 132 so that grid 132 normally maintains a positive voltage with respect to ground causing tube 130 to conduct. The parallel combination of capacitor 145, resistor 147 and clamping diode 149 returns cathode 134 to ground. The combination of capacitor 145 and resistor 147 has a relatively long time constant with respect to the length of pulses conventionally transmitted along the shift register, but a relatively short time constant with respect to pulses which are to be employed at the input of tube 130. A relatively long negative pulse 178 applied at terminal 174 with respect to terminal 176 results at cathode 134 in a negative going pulse 151 having a normal base of the quiescent positive operating voltage of cathode 134, and a ground level operating region. Since this destroys the quiescent positive operating voltage this second pulse source may be descriptively termed as an anti-bias pulse source. Tube 130 is employed in a cathode follower arrangement to provide a relatively low impedance output level.

Diodes 68 are connected with their positive terminals toward output windings 14 on the first shift register and their negative terminals toward input windings 62 on the second shift register so that when no negative input pulse 178 is presented to tube 130, the aforementioned windings 62 will be incapable of receiving a signal from windings 14. This is because a positive bias is thus presented to the negative side of diodes 68. However, when a negative input pulse 178 is presented to cathode follower tube 130, the bias is removed from lead 82. At that time pulse information may be transferred through diodes 68 from the first shift register to the second shift register at the occurrence of the next shift pulse. A positive output pulse at the dotted end of winding 14 of core 10 will pass through diode 68 to the non-dotted end of winding 62 of core 60, causing core 60 to assume a negative state of flux saturation. When tube 72 generates the next shift pulse for the second shift register, core 60 will be returned to a state of positive flux saturation producing an output at winding 64 as hereinbefore described.

When it is desired to transfer information from the first shift register to the second shift register it is ordinarily desired that the same information be prevented from proceeding along the first shift register. Therefore, a first pulse generator tube 100 is provided having a plate 106 attached to B+, a grid 102 coupled to input terminal 111 through capacitor 110, and a cathode 104 returned to ground through the parallel combination of capacitor 115, resistor 114 and diode 119. The parallel combination of capacitor 115 and resistor 114 has a relatively long time constant for the length of pulses normally transferred along the shift register but a relatively short time for the longer pulses which are to be introduced at terminal 111, for example, positive input pulse 117. A grid resistor 112 returns grid 102 to ground. A biasing resistor 113 is coupled between grid 102 and a source of C— bias voltage sufficient to insure that tube 100 is normally in a cut off or nonconducting state.

When a positive going pulse 117 is applied at terminal 111, a positive pulse 121 occurs at cathode 104. Both in the conducting and nonconducting state, tube 100 presents a low impedance output at cathode 104 due to the cathode follower circuit arrangement employed. When the first shift register comprising cores 10, 20, 30, and 40 is in normal cascaded operation, the cathode circuit of tube 100 comprising capacitor 115 and resistor 114 provides a return from each of the input windings 12 to ground so as to provide a low impedance complete circuit for the charging of capacitor 19. However, when it is desired that information be cleared from the first shift register, tube 100 is operated producing an output pulse 121 at the cathode 104 of tube 100 thus raising line 128 to a positive potential, whereby further conduction through the diodes 18 is prevented. Pulse 121 does not cause any current to flow through input windings 12 of the respective cores since such a current is also prevented by diode 18.

Pulses 117 and 178 are ordinarily employed simultaneously in order that a "word" from the first shift register may be transferred to the second shift register, while at the same time diodes 18 are back biased to prevent further propagation of the "word" down the first shift register. The first shift register is then available for a further input at terminals 160 and 162.

It is important to note that actual transfer of the information either from the first shift register to the second, or along a particular shift register is not actually caused by enabling transfer pulse 178 or disabling transfer pulse 117, but rather by the shift pulses generated by tubes 32 and 72. The pulses 117 and 178 are timed and arranged to start before and finish after the generation of shift pulses by means of tubes 32 and 72.

Pulse generator tube 130 may be operated by an input 178 without the necessity of also operating shift pulse generator tube 110 by means of pulse 117; information will then be transferred to the second shift register without destroying such information in the first shift register.

There is shown in FIG. 1 a single second shift register composed of cores 60, 70, 80 and 90. This is by way of illustration and the invention also contemplates a plurality of second shift registers, with various selected diodes 68 going to various second shift registers; thus a coding or decoding operation may be performed. A "word" may be inserted in the first shift register composed of cores 10, 20, 30 and 40 and then taken apart or divided up into a plurality of second shift registers when one or more second pulse generators including a tube 130 are operated, causing various diodes 68 arranged to provide an input to various second shift registers to be conductive thus passing information to selected second shift registers. For example, a first diode 68 from output winding 14 of core 10 may be connected to an input winding 62 of a first core 60 of a second shift register. Then a second diode 68 leading from output winding 14 of first shift register core 20 may be connected to an input winding 62 of a first core 60 of a third shift register, and so on, as any coding or decoding arrangement indicates.

FIG. 2 illustrates, by block diagram, the manner in which a plurality of second shift registers may be employed with the circuitry of FIG. 1. Shown in FIG. 2 is a first shift register 200, as that set forth in FIG. 1, having connected thereto a plurality of second shift registers 210 and 220, such as the second shift register set forth in FIG. 1. The first shifft register 200 has information input terminals 160 and 162, and serial output terminals 164 and 166. The blocking pulse source 202 is employed to block serial passage of stored information along the register in response to a shift pulse received from shift pulse source 201. The blocking pulse source and the shift pulse source operate and are instrumented identically with their corresponding circuitry in FIG. 1. Terminal 203 is a connection to B plus for the shift coils 16 as set forth in FIG. 1. Diodes 68 from the output windings of the storage cores of the first shift register 200 are connected to inputs of parallel storage cores in second shift registers 210 and 220. Anti-bias pulse sources 212 and 222, connected respectively to second shift registers 210 and 220, are instrumented and operate as does the anti-bias pulse source of FIG. 1 to control the bias on diodes 68 thereby determining whether the information of the first shift register will be transferred to a particular second shift register. Shift pulse sources 211 and 221, connected respectively to the second shift registers 210 and 220, are instrumented and operate as does the shift pulse source connected to the second shift register in FIG. 1 to serially shift information along their respective second shift registers. Serial output terminals 170 and 172, and 224 and 226 are connected to their respective second shift registers as serial output terminals 170 and 172 are connected to their second shift register in FIG. 1. Terminals 213 and 223 are connections to B plus for the shift coils of their respective second shift registers as is shown in the second shift register of FIG. 1. It should, of course, be understood that there may be any desired number of second shift registers. These second shift registers would be instrumented identically to the second shift register of FIG. 1, would have the same associated circuitry, and would have the input to their respective gating diodes 68 from the output coils 14 of corresponding parallel storage elements in the first shift register.

Although shift registers comprising four cores are shown in the drawing, it is to be understood that the present circuit is applicable to shift registers having a greater or lesser number of cascaded cores or to other storage devices employing serial shift pulses. Also, it is apparent that other storage elements similar in operation to magnetic cores may be used instead of the magnetic cores employed herein.

Obviously many modifications and variations of the present invention are possible in the light of the above teachings. It is therefore to be understood that within the scope of the appended claims the invention may be practiced otherwise than as specifically described.

What is claimed is:

1. In combination, a pair of shift registers each comprising a plurality of magnetic cores of high magnetic remanence adapted to shift bits of information from one core to the next, a first input winding on each core of the first shift register and on the second and subsequent cores of the second shift register, an output winding on each core for driving the first input winding on the next core, a second input winding on each core of the second shift register, and a coupling circuit between said output winding and the first input winding on the next core, said coupling circuit including a first unilateral impedance, a second unilateral impedance between an output winding on a core of the first shift register and one end of the second input winding of a corresponding core on the second shift register, and means for selectively biasing said unilateral impedances to conducting and nonconducting states for the transfer of information in substantially the time period of one shift.

2. The apparatus of claim 1 having a first source of pulses connected in common to the remaining sides of the second input windings on said second shift register and having a second source of pulses coupled in common to the first input windings on said first shift register whereby said unilateral impedances may be biased to conducting or nonconducting states for the transfer of information in substantially the time period of one shift pulse.

3. The combination of claim 1 wherein there are a plurality of said second shift registers with selected second unilateral impedances going to selected second shift registers for providing coding operation.

4. In combination, a pair of shift registers each comprising a plurality of magnetic cores of high magnetic remanence adapted to shift bits of information from one core to the next, a first input winding on each core of the first shift register and on the second and subsequent cores of the second shift register, an output winding on each core for driving the first input winding on the next core, a second input winding on each core of the second shift register, a shift winding on each core, and a coupling circuit between said output winding and the first input winding on the next core, said coupling circuit including a first diode, a second diode between an output winding on a core of the first shift register and a first input winding of a corresponding core on the second shift register, means for selectively biasing said second diode to conducting and nonconducting states, a shift pulse generator for driving each said shift winding, a low impedance source of pulses selectively operable concurrently with said shift pulse generator for the transfer of information in substantially the time period of one shift pulse, and means coupling said source of pulses to said coupling circuit.

5. In combination, a pair of shift registers each comprising a plurality of magnetic cores of high magnetic remanence adapted to shift bits of information from one core to the next, a first input winding on each core of the first shift register and on the second and subsequent cores of the second shift register, an output winding on each core for driving the first input winding on the next core, a second input winding on each core of the second shift register, and a coupling circuit between said output winding and the first input winding on the next core, said coupling circuit including a forward circuit path and a return circuit path, a first unilateral impedance in said forward circuit path, a first source of pulses having low impedance output connections interposed in said return circuit path, a second unilateral impedance between an output winding on a core of the first shift register and a second input winding on a core of the second shift register, and a second source of pulses coupled to selectively bias off said second unilateral impedance.

References Cited in the file of this patent

UNITED STATES PATENTS

| | | |
|---|---|---|
| 2,863,138 | Hemphill | Dec. 2, 1958 |
| 2,886,799 | Crooks | May 12, 1959 |
| 2,911,621 | Crooks | Nov. 3, 1959 |
| 2,958,076 | Kelner | Oct. 25, 1960 |
| 2,979,702 | Zarcone | Apr. 11, 1961 |